(12) United States Patent
Kumar

(10) Patent No.: US 11,590,038 B2
(45) Date of Patent: Feb. 28, 2023

(54) FLOOR PANEL SYSTEM FOR VEHICLES

(71) Applicant: Anjani Kumar, Northville, MI (US)

(72) Inventor: Anjani Kumar, Northville, MI (US)

( * ) Notice: Subject to any disclaimer, the term of this patent is extended or adjusted under 35 U.S.C. 154(b) by 253 days.

(21) Appl. No.: 15/929,166

(22) Filed: Nov. 15, 2019

(65) Prior Publication Data

US 2020/0155386 A1 May 21, 2020

Related U.S. Application Data

(60) Provisional application No. 62/806,836, filed on Feb. 17, 2019, provisional application No. 62/768,890, filed on Nov. 17, 2018.

(51) Int. Cl.
*B62D 25/00* (2006.01)
*A61G 3/08* (2006.01)
*B62D 25/20* (2006.01)

(52) U.S. Cl.
CPC ....... *A61G 3/0808* (2013.01); *B62D 25/2054* (2013.01)

(58) Field of Classification Search
CPC ...... A61G 3/0808; B60P 3/079; B60P 7/0815; E04F 15/02038; E04F 2201/0115; E04F 2201/041; E04F 2201/023; E04F 2201/021
USPC .............. 296/65.04; 410/7–11, 23, 104, 105; 52/589.1, 588.1, 592.1
See application file for complete search history.

(56) References Cited

U.S. PATENT DOCUMENTS

| | | | | |
|---|---|---|---|---|
| 5,026,225 A * | 6/1991 | McIntyre | ............. | A61G 3/0808 410/23 |
| 5,827,022 A * | 10/1998 | Tovani | ..................... | B64D 9/00 410/8 |
| 6,595,142 B2 | 7/2003 | Christensen | | |
| 7,021,012 B2 * | 4/2006 | Zeng | ................. | E04F 15/02161 52/589.1 |
| 7,556,463 B1 * | 7/2009 | Hall | ....................... | B60P 7/0815 410/104 |
| 8,640,418 B2 | 2/2014 | Paetrow et al. | | |
| 2009/0028658 A1 * | 1/2009 | Adams | .................. | B60P 7/0815 410/104 |

(Continued)

FOREIGN PATENT DOCUMENTS

| | | |
|---|---|---|
| EP | 1 495 946 A2 | 1/2005 |
| EP | 1 688 298 A1 | 8/2006 |
| EP | 2570104 A1 | 3/2013 |

(Continued)

OTHER PUBLICATIONS

BraunAbility Innotrax® Bespoke aluminium flooring for vehicles. [retrieved Oct. 11, 2019]. 2 pages. Retrieved from the Internet: <URL:https://www.braunability.eu/en/products/flooring-and-seating/innotrax/>.

(Continued)

*Primary Examiner* — Stephen T Gordon
(74) *Attorney, Agent, or Firm* — Woodard, Emhardt, Henry, Reeves & Wagner, LLP

(57) ABSTRACT

A vehicle flooring system for converting regular vehicles into wheelchair accessible vehicles. The flooring system is made up of individual flooring panels connected via a snap fit type tongue and lip connection. Each individual panel contains an integral track. The integral track forms a positive lock with the track channels. The flooring system is able to satisfy government regulations concerning seat and wheelchair location pull testing.

29 Claims, 13 Drawing Sheets

(56) References Cited

U.S. PATENT DOCUMENTS

2014/0248103 A1\* 9/2014 Baldsiefen ............ B60P 7/0815
　　　　　　　　　　　　　　　　　　　　　　　410/104
2014/0345221 A1\* 11/2014 Stanchfield ....... E04F 15/02038

FOREIGN PATENT DOCUMENTS

| EP | 3 081 432 A1 | 10/2016 |
|---|---|---|
| GB | 2 427 176 A | 12/2006 |
| JP | H08-218606 A | 8/1996 |
| KR | 10-1997-0036573 A | 7/1997 |
| KR | 10-0762943 B1 | 10/2007 |

OTHER PUBLICATIONS

Schnierle Seating Systems Aluminium system floor M1 and M2. [retrieved Oct. 11, 2019]. 2 pages. Retrieved from the Internet: <URL: https://www.schnierle.de/aluminum-floorsystem-m1-and-m2-en.html>.
NMI Safety Systems Floor Tracking & Accessories. [retrieved Oct. 11, 2019]. 5 pages. Retrieved from the Internet: <URL: https://www.nmisafety.com/product-category/seat-fitting-lockables-in-floor-track/floor-tracking-accessories/>.
AMF-Bruns Smartfloor Aluminium Floor Solutions. [retrieved Nov. 15, 2019]. 1 page. Retrieved from the Internet: <URL: https://www.amf-bruns-mobility.com/products/smartfloor/>.
International Patent Application PCT/US2019/070010 International Search Report dated Mar. 13, 2020. 11 pages.
PCT, International Application No. PCT/US2019/070010 International Preliminary Report on Patentability, 8 pages, dated May 27, 2021.

\* cited by examiner

FLOOR PANEL SYSTEM FOR VEHICLES

CROSS REFERENCE TO RELATED APPLICATIONS

This application claims the benefit of U.S. Provisional Patent Application No. 62/768,890, filed on Nov. 17, 2018, which is hereby incorporated by reference.

This application claims the benefit of U.S. Provisional Patent Application No. 62/806,836, filed on Feb. 17, 2019, which is hereby incorporated by reference.

BACKGROUND

Converting vans, buses, and other vehicles into those with flooring systems capable of providing flexible seating arrangements as well as accommodating wheelchairs is an expensive process. The labor hours needed to convert the van is considerable. The typical installation process includes adhering and bolting metal and plywood flooring materials to the floor, and the resulting floor is then covered by a flooring material such as carpets and/or rubber mats. Many governments have safety regulations that require the flooring systems to pass a pull test that mimics some of the forces experienced during typical collisions. To reduce the risk of failing the pull test, many suppliers of these flooring systems require each metal plank or panel of the system to be bolted to the floor at multiple locations along the entire length of the panel. As should be recognized, this bolting process is time consuming and labor intensive.

Thus, there is a need for improvement in this field.

SUMMARY

A unique vehicle flooring system has been developed for securing seats, wheelchairs, and other support structures in a vehicle such as a conversion van. The flooring system includes a series of aluminum extruded floor panels with integral channels that are snap fitted together. In one form, the snap fit connection includes a tongue and lip type connection along the edges of the panels. The snap fit connections extend for the full length of each of the panels so as to ensure the panels remain engaged even during a crash. This snap fit connection reduces time and labor costs for typical vehicle floor conversions because the number of screws or other fasteners needed during the conversion process is dramatically reduced. The floor panels themselves generally have a uniform wall thickness, but the panels further have reduced thickness areas or portions at the tongue and lip connections. These reduced thickness portions allow the tongues at the connections to flex during engagement.

Each integral channel in the panel has a pair of positive locking grooves located on opposing sides of the integral channel. The integral channels are designed to receive hardware tracks or other types of anchors that are used to secure the seats or wheelchairs to the floor panels. The hardware tracks have angled edges that are configured to engage with the grooves inside integral channels to form a positive lock. As a result of the positive lock, the flooring system is able to withstand governmental regulations regarding pull testing in the locations where seats or wheelchairs are mounted.

The flooring system has a smooth and flat surface area with hardware that does not have to be removed and does not protrude above the floor level. This is accomplished by the fastener pocket. The fastener pocket allows the head of the chosen fastener to rest in the opening as the shaft passes through the integral track to secure the seat or wheelchair without protruding above the floor level. Additionally, the tracks of the flooring system run the entire length of the vehicle flooring space. This allows for increased flexibility in seating arrangements depending on the number of passengers and their preferred seating position.

The system and techniques as described and illustrated herein concern a number of unique and inventive aspects. Some, but by no means all, of these unique aspects are summarized below.

Aspect 1 generally concerns a system that includes vehicle floor panels with a snap-fit connection between the floor panels.

Aspect 2 generally concerns the system of any previous aspect in which the snap-fit connection includes a cantilever connection between the floor panels.

Aspect 3 generally concerns the system of any previous aspect in which the floor panels have a general uniform wall thickness with one or more reduced wall thickness portions at the snap fit connection.

Aspect 4 generally concerns the system of any previous aspect in which the floor panels are extruded.

Aspect 5 generally concerns the system of any previous aspect in which the floor panels are made of aluminum.

Aspect 6 generally concerns the system of any previous aspect in which the snap-fit connection extends for the full length of the floor panels.

Aspect 7 generally concerns the system of any previous aspect in which the snap-fit connection includes a connector tongue with a base defining a tongue flex groove.

Aspect 8 generally concerns the system of any previous aspect in which the snap-fit connection includes a receptacle with a base defining a receptacle flex groove.

Aspect 9 generally concerns the system of any previous aspect in which the floor panels each has two receptacle arms extending flush with opposing support surfaces of the vehicle floor panels.

Aspect 10 generally concerns the system of any previous aspect in which the at least one of the floor panels has a track that defines a channel.

Aspect 11 generally concerns the system of any previous aspect in which the channel has a positive lock groove defined inside the track.

Aspect 12 generally concerns the system of any previous aspect in which the foot is received in the channel of the track to form a positive lock.

Aspect 13 generally concerns the system of any previous aspect in which the foot has a lock wing engaged with the lock groove of the channel to form a positive lock connection.

Aspect 14 generally concerns the system of any previous aspect in which the foot has a crown.

Aspect 15 generally concerns the system of any previous aspect in which the channel is integral with the floor panel.

Aspect 16 generally concerns the system of any previous aspect in which the channel has one or more angled edges configured to form one or more positive lock grooves.

Aspect 17 generally concerns the system of any previous aspect in which the channel has a fastener pocket.

Aspect 18 generally concerns a method of operating the system of any previous aspect.

Further forms, objects, features, aspects, benefits, advantages, and embodiments of the present invention will become apparent from a detailed description and drawings provided herewith.

DETAILED DESCRIPTION OF SELECTED EMBODIMENTS

Figure 1:
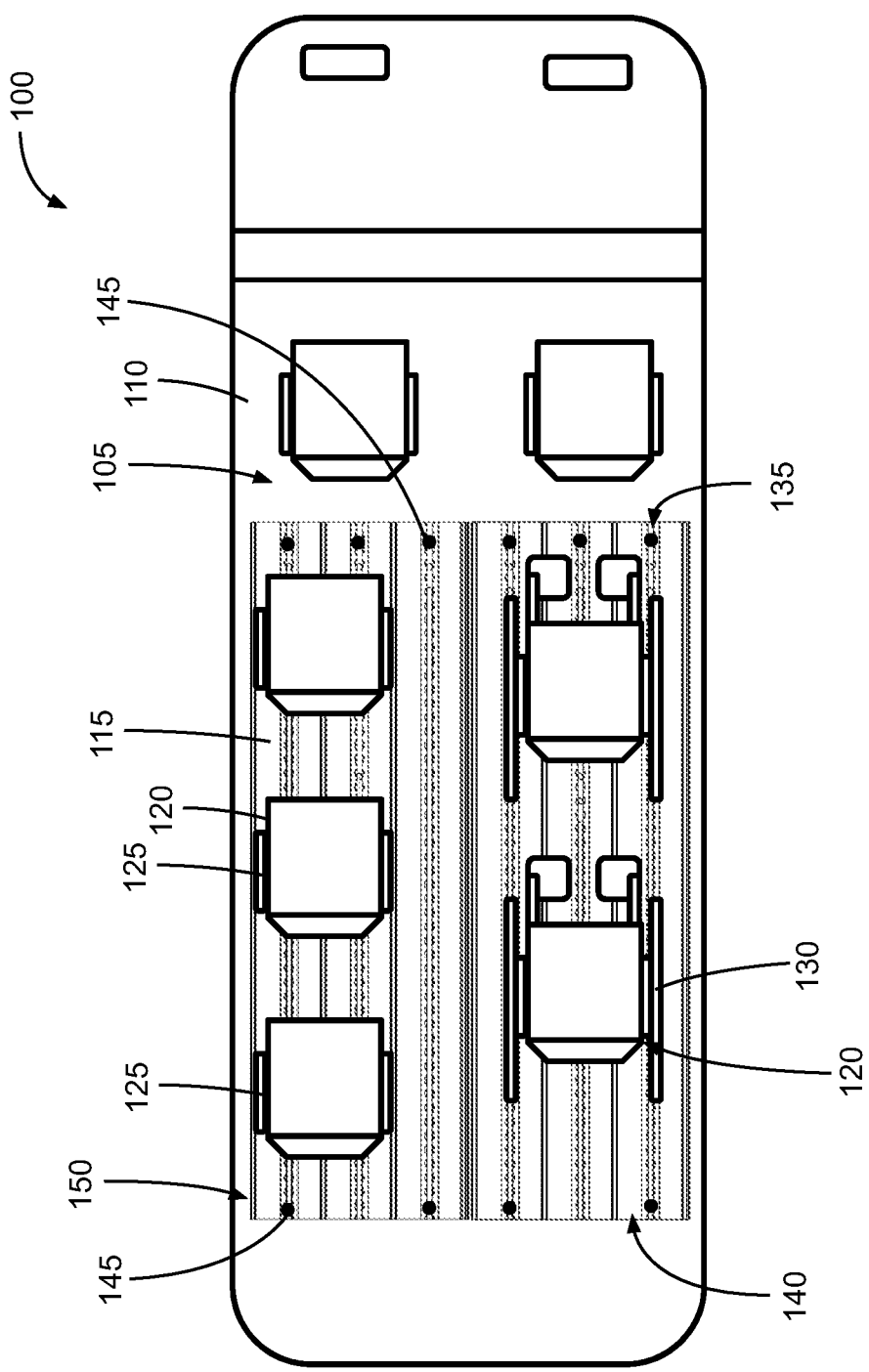
FIG. 1 is a top view of a vehicle that includes a flooring system according to one example.

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features that are not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will likely first appear in FIG. 1, an element identified by a "200" series reference numeral will likely first appear in FIG. 2, and so on.

Figure 2:
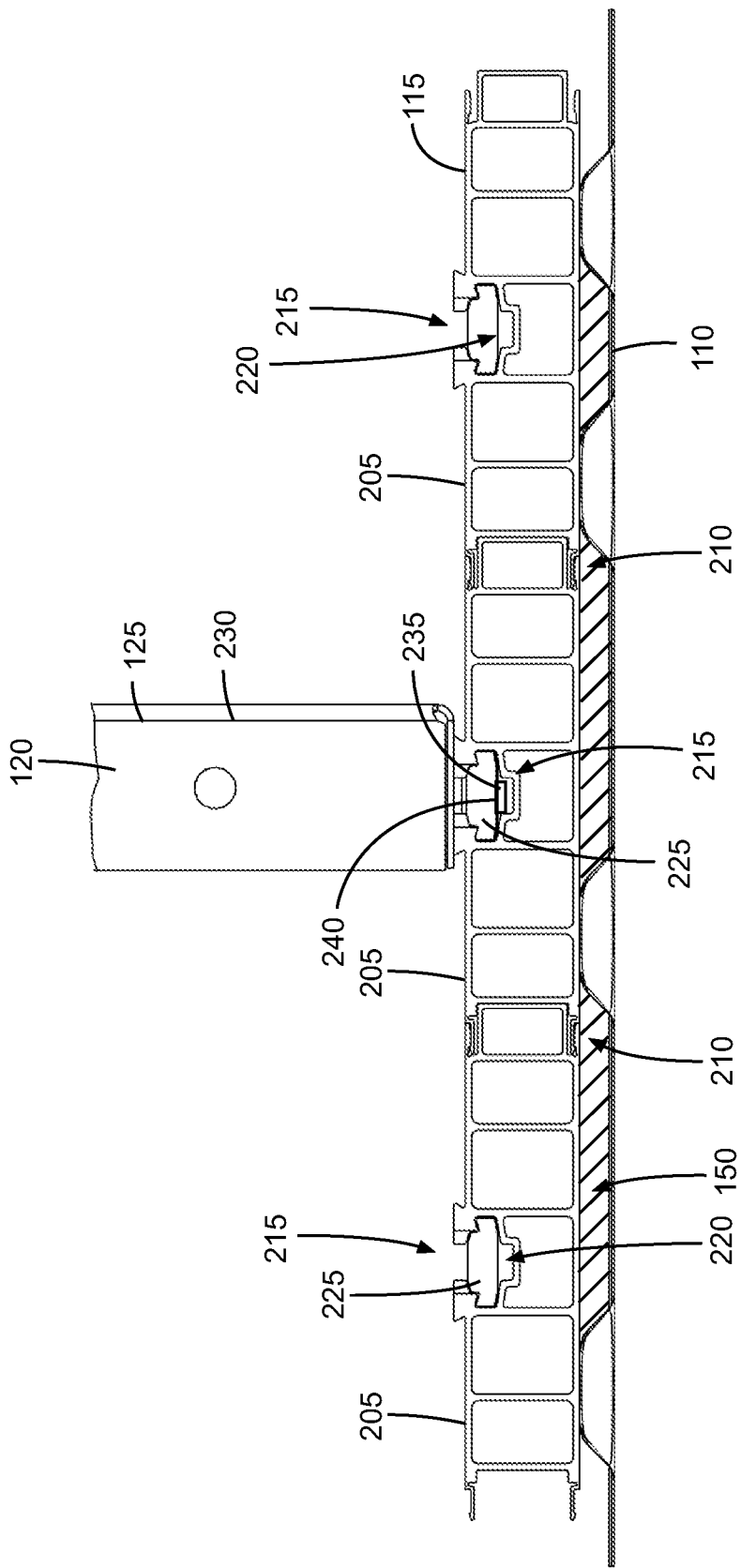
FIG. 2 is a partial cross-sectional view of the FIG. 1 flooring system.
Figure 3:
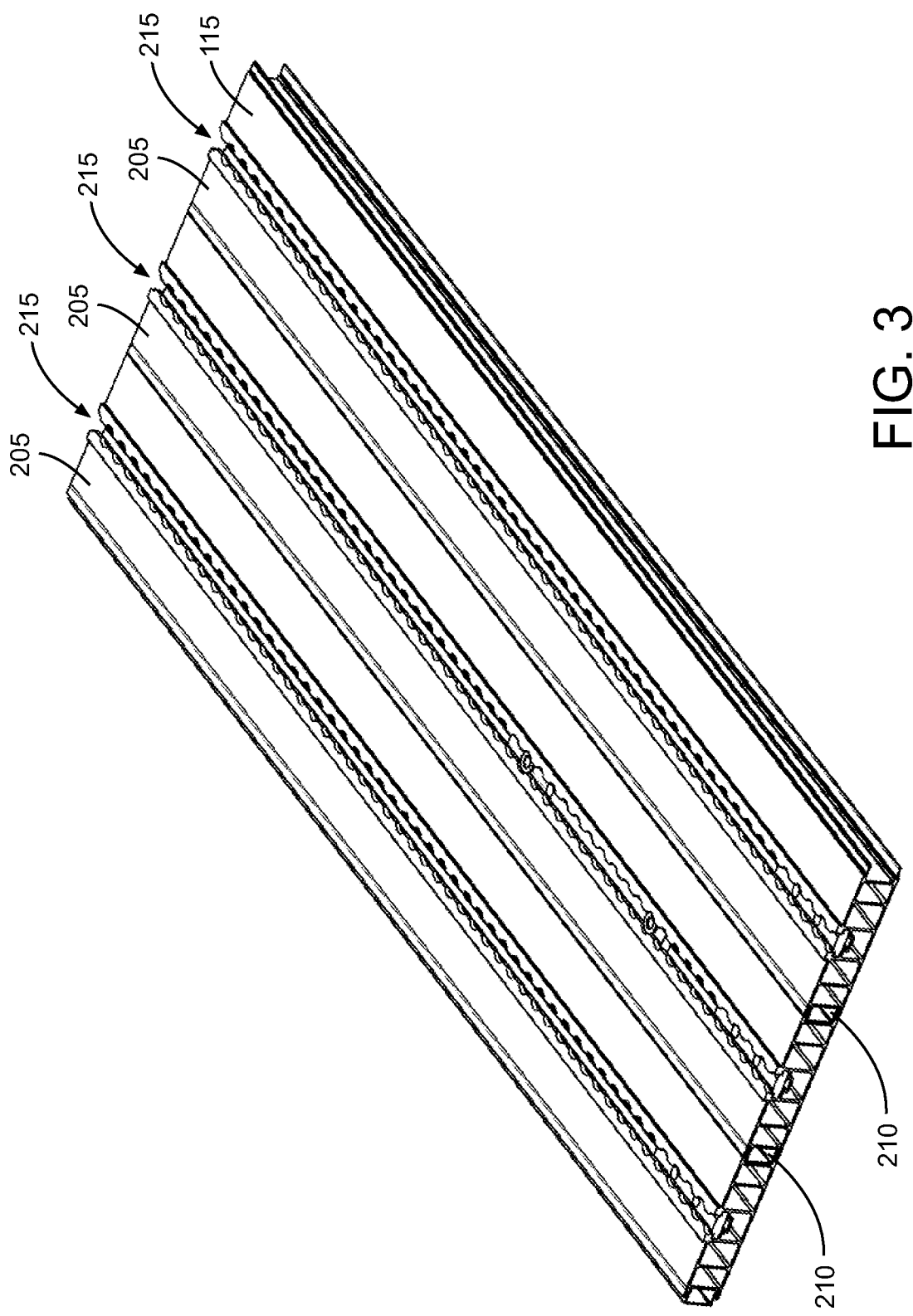
FIG. 3 is a perspective view of the FIG. 1 flooring system.
Figure 4:
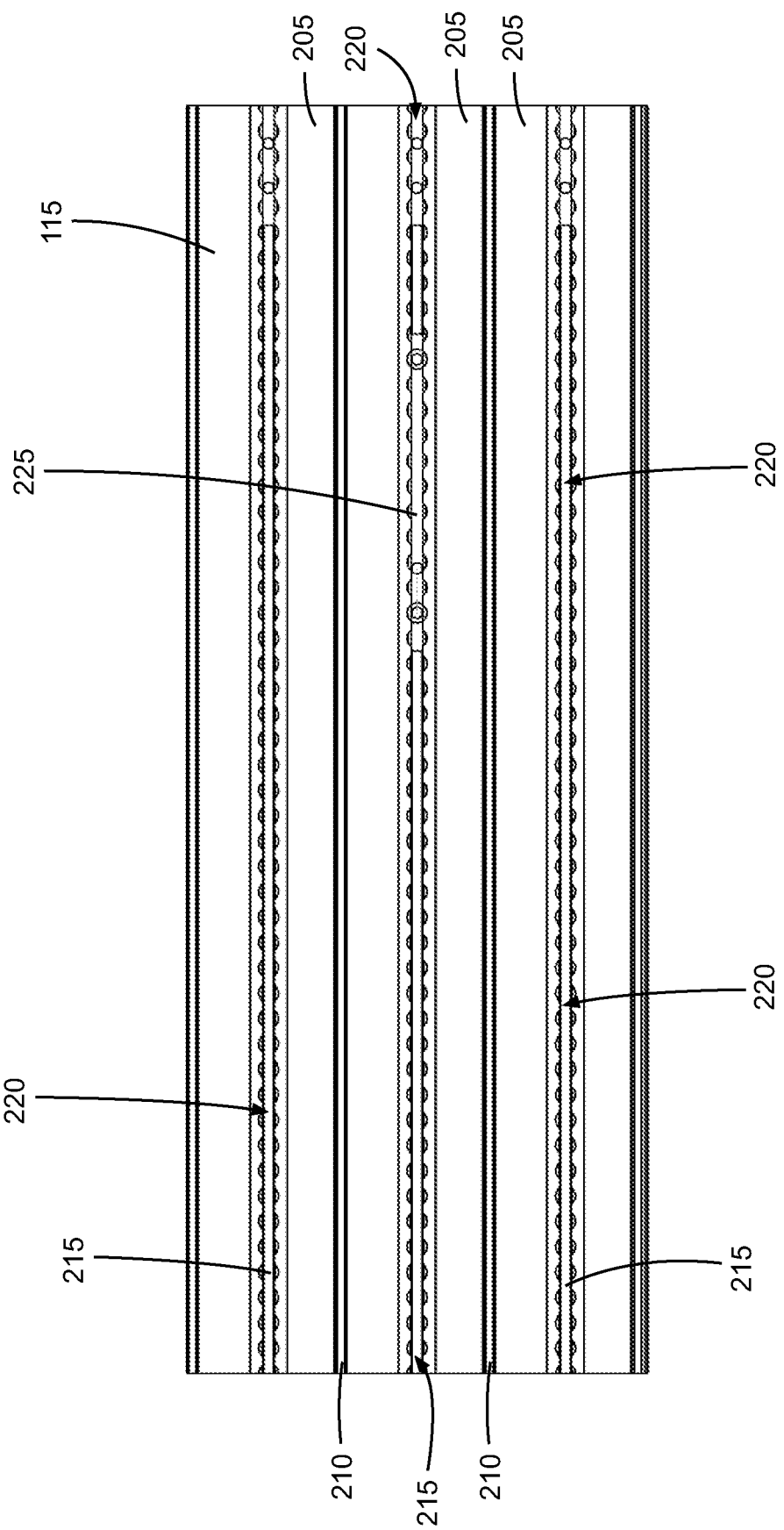
FIG. 4 is a top view of the FIG. 1 flooring system.
Figure 5:
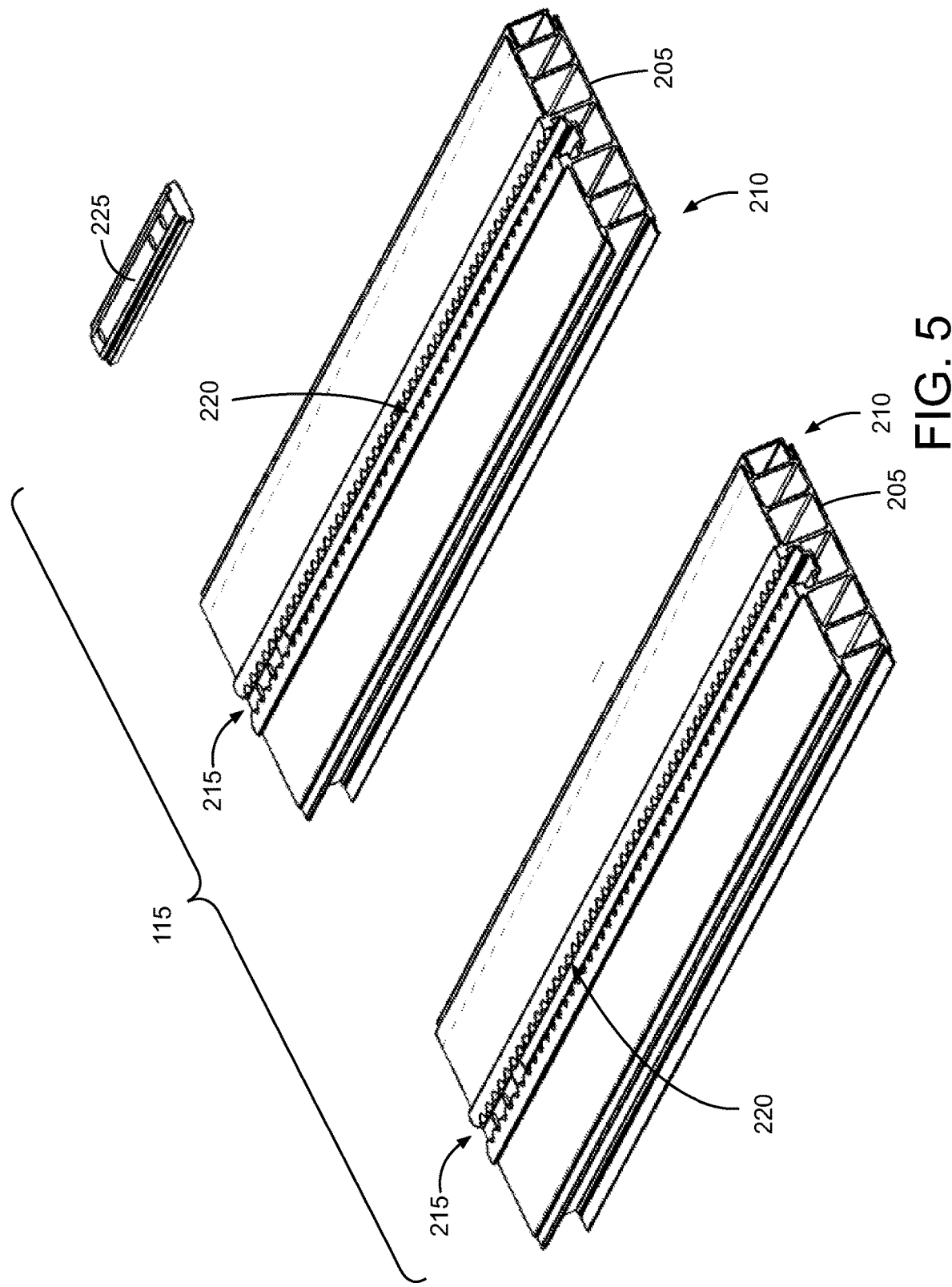
FIG. 5 is an exploded view of the FIG. 1 flooring system.

As shown in FIG. 1, a vehicle 100 in one example has a passenger cabin 105 with a floor 110. The vehicle 100 has a flooring system 115 that is attached to the floor 110. The vehicle 100 further includes one or more support structures 120 configured to be removably coupled to the flooring system 115. These support structures 120 can include a seat 125, a wheelchair 130, benches, shelving systems, and/or other types of support structures 120 found in vehicle 100. As can be seen, the flooring system 115 has a first end 135 and a second end 140. At the first end 135 and second end 140, the flooring system 115 is secured to the floor 110 with one or more fasteners 145 such as bolts. The flooring system 115 is further adhered to the floor 110 of the vehicle 100 by use of an adhesive 150. As will be explained in further detail below, the flooring system 115 includes a unique snap fit connection that extends for the full length of the flooring system 115. With this snap-fit connection and adhesive 150 construction, the flooring system 115 only needs to be secured to the floor 110 with the fasteners 145 at the first end 135 and second end 140 in order to satisfy most governmental safety pull tests. In other words, additional fasteners 145 are not needed to secure the flooring system 115 to the floor 110 between the first end 135 and second end 140. This construction of the flooring system 115 reduces the number of fasteners 145 required during installation. This construction of the flooring system 115 also reduces labor and time needed during the floor conversion process. While the flooring system 115 is depicted as having the fasteners 145 only secured to the floor 110 at the first end 135 and second end 140, the fasteners 145 can be secured elsewhere in other examples in to provide additional security or for other reasons.

As shown in FIGS. 2, 3, 4, and 5, the flooring system 115 of the vehicle 100 includes one or more floor panels 205. The floor panels 205 are connected together via a snap-fit connection 210. The snap-fit connection 210 extends for the full length of the floor panels 205 so that the floor panels 205 remain firmly connected together even during governmental safety tests. The floor panels 205 further define one or more tracks 215 to which the seats 125, wheelchairs 130, and/or other support structures 120 are secured. The tracks 215 define one or more track channels 220 configured to receive a foot 225 that is connected to a leg 230 of the seat 125. The leg 230 is secured to the foot 225 by at least one fastener 235 such as a bolt 240. It should be recognized that the foot 225 can be secured to other structures. For example, tethers for the wheelchair 130 can be secured to the foot 225. The foot 225 is slidably received in the floor panels 205 so that the foot 225 can be repositioned or removed to accommodate different seating arrangements. The foot 225 forms a positive locking arrangement with the track channels 220 so that the support structures 120 remain firmly secured to the flooring system 115.

Figure 6:
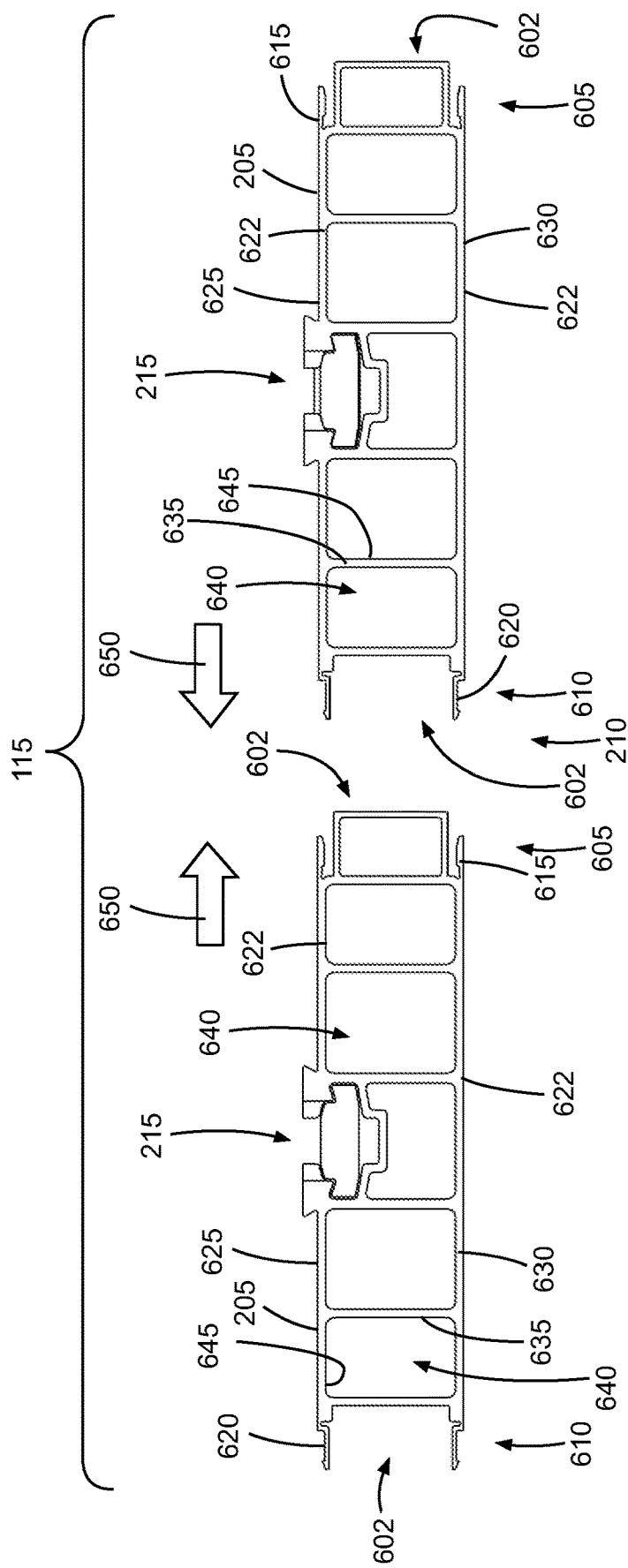
FIG. 6 is an exploded end view of the FIG. 1 flooring system.

The connection of two floor panels 205 of the flooring system 115 via the snap-fit connection 210 is depicted in FIG. 6. As shown, the floor panels 205 have two connector sides 602. Again, the snap-fit connection 210 extends from the entire length of these connector sides 602 so as to provide a secure connection between the floor panels 205. As shown, the connector sides 602 of each floor panel 205 include a connector receptacle side 605 and a connector protrusion side 610. The snap-fit connection 210 includes a snap-fit connector receptacle 615 on the connector receptacle side 605 and a snap-fit connector protrusion 620 on the connector protrusion side 610.

As shown in FIG. 6, the floor panels 205 have one or more support surfaces 622. The support surfaces 622 include a passenger facing surface 625 and a vehicle facing surface 630. The passenger facing surface 625 is configured to face towards the passengers. The passenger facing surface 625 has a smooth finish and forms a flat surface to facilitate easy rolling of wheelchairs 130. The generally flat passenger facing surface 625 reduces the risk of passengers tripping when walking inside the passenger cabin 105 of the vehicle 100. The vehicle facing surface 630 is configured to face the existing floor 110 of the vehicle. As shown, the adhesive 150 is applied to the vehicle facing surface 630 in order to secure the vehicle facing surface 630 to the floor 110 of the vehicle 100. Between the passenger facing surface 625 and the vehicle facing surface 630 is one or more ribs 635. The ribs 635 are configured to support the passenger facing surface 625 and vehicle facing surface 630. The ribs 635 also work to distribute the load on the vehicle facing surface 630. This distribution allows for the flooring system 115 to withstand strong forces without movement of the support structures 120 in the event of a collision. The ribs 635 serve to create one or more panel cavities 640. The panel cavities 640 serve to reduce the manufacturing costs and weight of the flooring system 115 by reducing the amount of material needed to extrude the floor panels 205. The panel cavities 640 define at least one cavity surface 645. The cavity surface 645 is configured to define the perimeter of the panel cavities 640. The cavity surface 645 also creates a specified thickness portion for the passenger facing surface 625 and the vehicle facing surface 630.

The floor panels 205 attach via the snap-fit connection 210 in the manner shown by arrows 650 in FIG. 6. Again, the snap-fit connection 210 runs the entire length of the floor panels 205. This is accomplished by manufacturing the floor panels 205 through an extrusion process. In one example, the floor panels 205 are made of metal, such as steel or aluminum, and in one example, the floor panels 205 are made from extruded aluminum. The arrows 650 show that when the two floor panels 205 are pushed together, the snap-fit connector protrusion 620 of the connector protrusion side 610 enters and combines with the snap-fit connector receptacle 615 of the connector receptacle side 605 in order to create a strong connection between the two floor panels 205.

Figure 7:
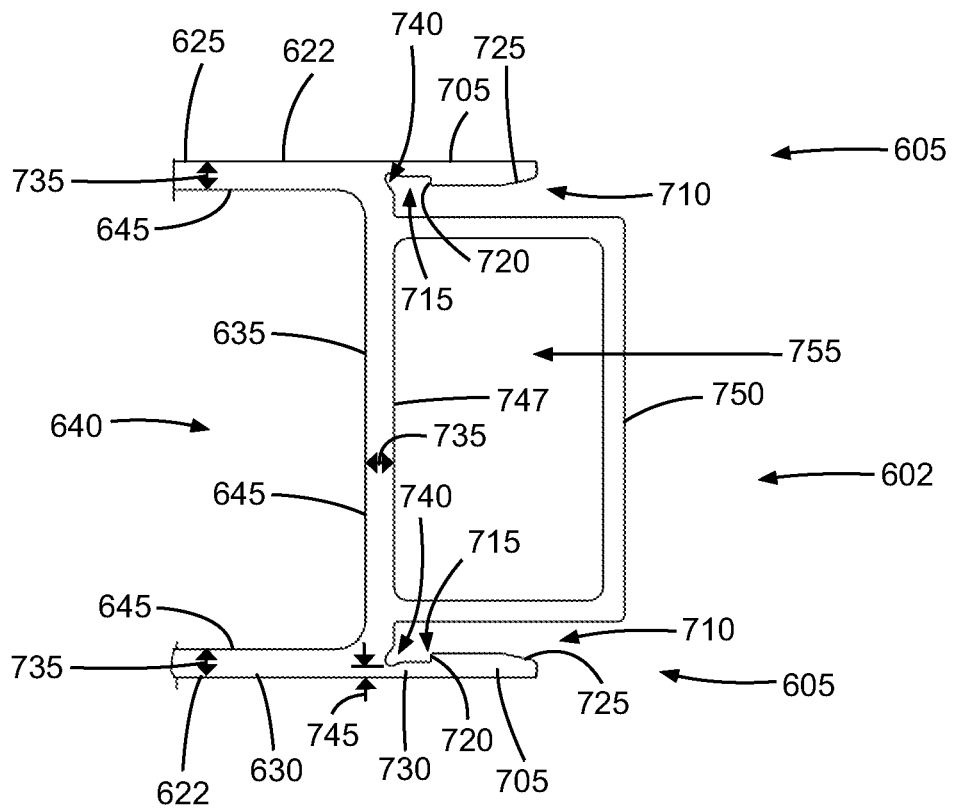
FIG. 7 is an enlarged end view of a connector side of a floor panel in the FIG. 1 flooring system.

Turning to FIG. 7, the connector receptacle side 605 includes one or more receptacle arms 705, one or more receptacle channels 710, a snap-fit notch 715, a receptacle lip 720, a beveled edge 725, and a receptacle base 730. The receptacle arms 705 define the receptacle channel 710. The receptacle channel 710 allows the connector protrusion side 610 to snap into the snap-fit notch 715. The receptacle lip 720 is designed to prevent the disconnection of the snap fit by simple pulling forces. Any attempt to simply pull the floor panels 205 apart results in an abutment of the receptacle lip 720 and a restriction in movement. The receptacle arms 705 also have the beveled edge 725. The beveled edge 725 is configured to guide the connector protrusion side 610 into the receptacle channels 710. This assures proper connection and placement of the floor panels 205. The receptacle arms 705 connect to the passenger facing surface 625 and the vehicle facing surface 630 at the receptacle base 730.

As noted before, the floor panels 205 in one form are manufactured using an extrusion process in which aluminum is extruded to form the floor panels 205. Due to the extrusion process, the extruded floor panels 205 generally have a uniform wall thickness, but the floor panels 205 have selected areas with reduced wall thicknesses. The extrusion process forces the softened aluminum through a die in the shape of the desired floor panels 205. This creates floor panels 205 of a uniform shape. By extruding the floor panels 205, the flooring system 115 is able to be manufactured at a decreased cost. This translates to a more affordable flooring system 115. In the illustrated example, the passenger facing surface 625 has a wall thickness 735 that is generally uniform throughout the floor panel 205 within normal engineering tolerances. As can be seen, however, the receptacle base 730 defines a receptacle flex groove 740 with a receptacle flex groove wall thickness 745. The receptacle flex groove wall thickness 745 at the receptacle flex groove 740 is thinner than the wall thickness 735 throughout the rest of the floor panel 205. The receptacle flex grooves 740 at the base make receptacle arms 705 flexible so that the receptacle arms 705 are able to receive the snap-fit connector protrusion 620.

The wall thickness 735 of the floor panel 205 is again generally uniform with the exception of the receptacle flex grooves 740. As shown in FIG. 7, the receptacle flex groove 740 defines the wall thickness 735 of the passenger facing surface 625 measured from the passenger facing surface 625 to the cavity surface 645. The vehicle facing surface 630 also has the wall thickness 735. The wall thickness 735 of the vehicle facing surface 630 is measured from the vehicle facing surface 630 to the cavity surface 645. Additionally, the ribs 635 have the wall thickness 735. The wall thickness 735 of the ribs 635 is measured from the cavity surface 645 to a guide space surface 747. The wall thickness 735 is generally uniform for the passenger facing surface 625, vehicle facing surface 630, and ribs 635. Again, the receptacle flex groove wall thickness 745 is thinner than the passenger facing surface 625 and vehicle facing surface 630. The receptacle flex groove wall thickness 745 is created during extrusion of the floor panels 205. Once more, the thinner receptacle flex groove wall thickness 745 allows for the receptacle arms 705 to flex and move without breaking. This results in a stronger connection that is able to handle sudden large jumps in force as a result of its more flexible nature.

The connector receptacle side 605 further includes a connector guide 750 with a guide space 755. The connector guide 750 partially defines the receptacle channels 710. The connector guide 750 further assists in maintaining the proper alignment of the connector receptacle side 605 and the connector protrusion side 610. By maintaining the alignment of the connector receptacle side 605 and the connector protrusion side 610, the connector guide 750 gives rigidity to the connected floor panels 205. The interconnection of the connector receptacle side 605 and connector protrusion side 610 via the connector guide 750 removes some of the stress from the receptacle arms 705. This reduces the chance of failure at the receptacle base 730. The guide space 755 serves to reduce the weight of the final product and reduce the overall cost.

Figure 8:
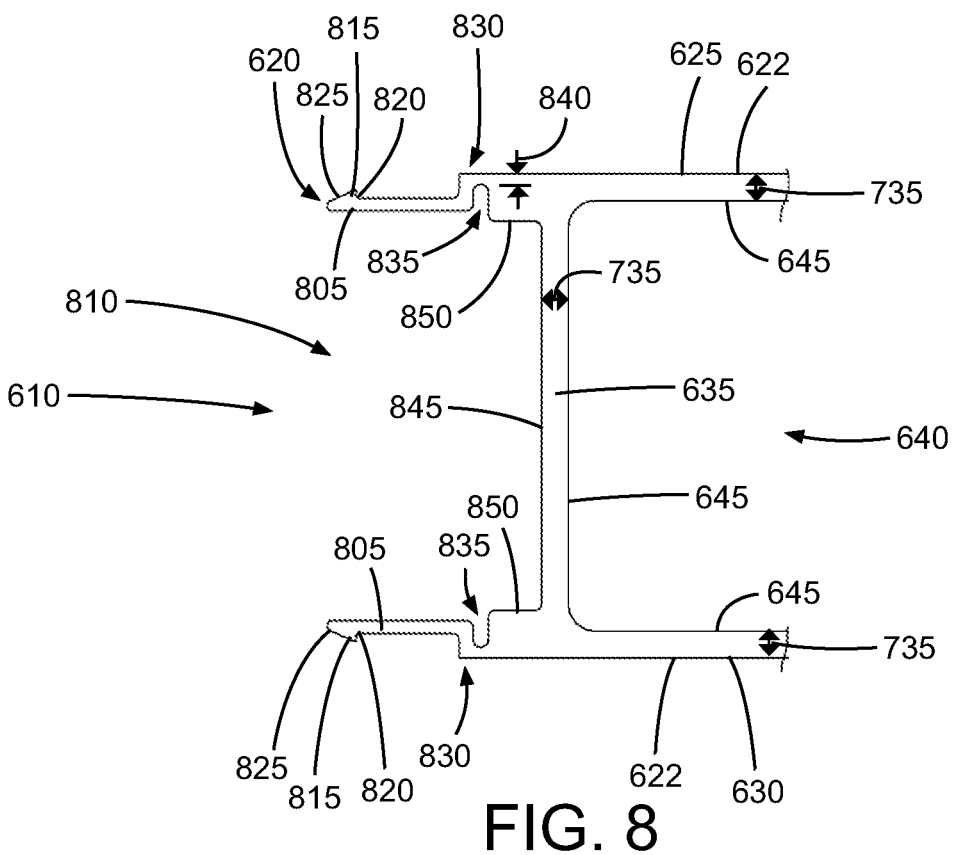
FIG. 8 is an enlarged end view of a connector protrusion side of the FIG. 7 floor panel.

As depicted in FIG. 8, the connector protrusion side 610 includes at least one snap-fit connector protrusion 620. The snap-fit connector protrusion 620 has one or more connector tongues 805. In the illustrated example, the snap-fit connector protrusion 620 has two, opposing connector tongues 805 so as to facilitate a firm connection between the floor panels 205. As shown, the pair of connector tongues 805 define a guide cavity 810 where the connector guide 750 is received. Each connector tongue 805 has a tongue head 815 with a tongue lip 820 and a beveled edge 825. The tongue lip 820 prevents the easy disconnection of the floor panels 205 via a pulling force by interlocking with the receptacle lip 720 and restricting the movement of the floor panels 205. The beveled edge 825 facilitates a smooth entry of the connector protrusion side 610 into the connector receptacle side 605.

Opposite the tongue head 815, each connector tongue 805 has a tongue base 830 that defines a tongue flex groove 835. The tongue flex grooves 835 are formed during the extrusion process. The tongue flex grooves 835 allow the connector tongues 805 to flex during the snap-connection to the other floor panel 205. Once more, the wall thickness 735 of the floor panels 205 is generally uniform due to the extrusion process. The tongue flex grooves 835 each has a tongue flex groove wall thickness 840 that is thinner than the wall thickness 735. For example, the tongue flex groove wall thickness 840 is thinner than the wall thickness 735 at the passenger facing surface 625, vehicle facing surface 630, and ribs 635. As discussed earlier, the decreased thickness allows for the flexion of the tongue base 830 and an increase in maximum breaking stress. With the tongue flex groove wall thickness 840 being thinner than the wall thickness 735 of the rest of the receptacle arm 705, the connector tongues 805 are able to readily flex when needed.

As illustrated, the connector protrusion side 610 further has a guide end wall 845 and one or more guide side walls 850 that further define the guide cavity 810. The guide end wall 845 serves as the stop for the connector guide 750 so as to inhibit over insertion. In other words, the floor panels 205 are fully connected when the connector guide 750 can insert no further into the guide cavity 810. The guide side walls 850 further facilitate centering of the connector guide 750 in the guide cavity 810. The guide side walls 850 further serve to limit rotational motion of the connector guide 750 in the guide cavity 810.

Figure 9:
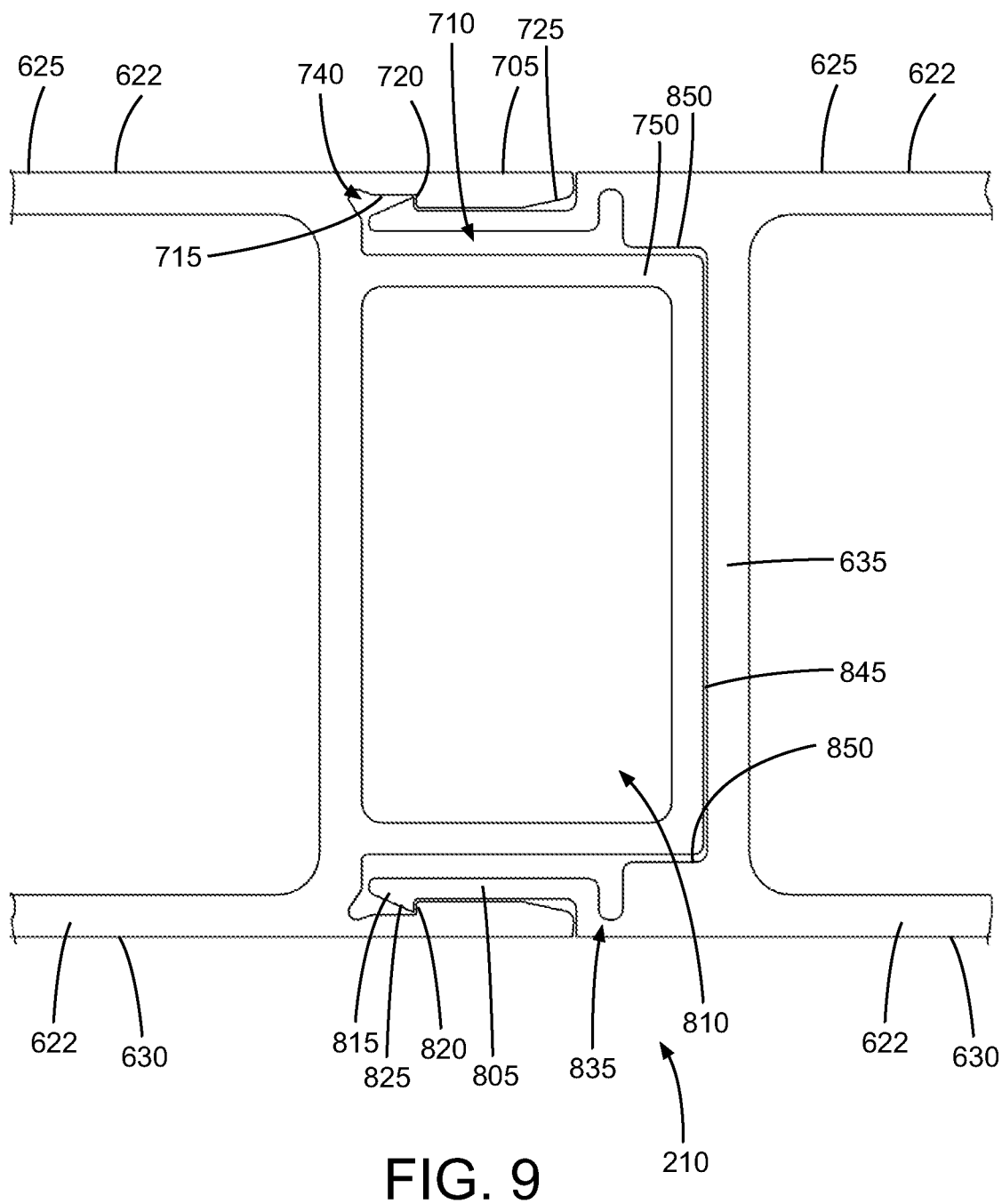
FIG. 9 is an enlarged end view of the floor panels joined via a snap-fit connection.

As illustrated in FIG. 9, the connector receptacle side 605 and connector protrusion side 610 are connected via the snap-fit connection 210. The connector receptacle side 605 and connector protrusion side 610 are typically pushed together to engage the snap fit connection. The beveled edge 725 of the receptacle arms 705 and the beveled edge 825 of the connector tongues 805 allow for the connector tongues 805 to be easily guided into the receptacle channels 710 of the connector receptacle side 605. While the connector protrusion side 610 is pushed into the connector receptacle side 605, the tongue flex groove 835 of the connector protrusion side 610 is flexed inward. During this time, the connector tongues 805 are forced together to accommodate the narrower receptacle channels 710. The receptacle lip 720 and tongue lip 820 are able to snap together once the connector guide 750 has been fully inserted into the guide cavity 810. The receptacle flex groove 740 and the tongue flex groove 835 allow for both the connector receptacle side 605 and the connector protrusion side 610 to have small fluctuations in position without breaking. This creates a flooring system 115 that is more durable and able to withstand sudden fluctuations in applied force.

Once assembled, the connector guide 750 comes to rest against the guide end wall 845. The guide side walls 850 surrounds a portion of the connector guide 750 and prevents rotation of the floor panels 205. Having a pair of receptacle arms 705 and connector tongues 805 connected at opposing support surfaces 622 creates a strong snap-fit connection 210 between the floor panels 205. As shown, the receptacle arms 705 are flush with the support surfaces 622 so that the support surfaces 622 are generally flat and smooth with the snap-fit connection 210. The integration of the connector guide 750 into the guide cavity 810 further allows the flooring system 115 to resist high forces in the event of a collision. Additionally, a level alignment of the floor panels 205 is maintained by the integration of the connector guide 750 into the guide cavity 810. It should be appreciated that the snap-fit connection 210 allows for the installation of the flooring system 115 to be completed rapidly with little in the way of tools or experience with vehicle floor installation.

Figure 10:
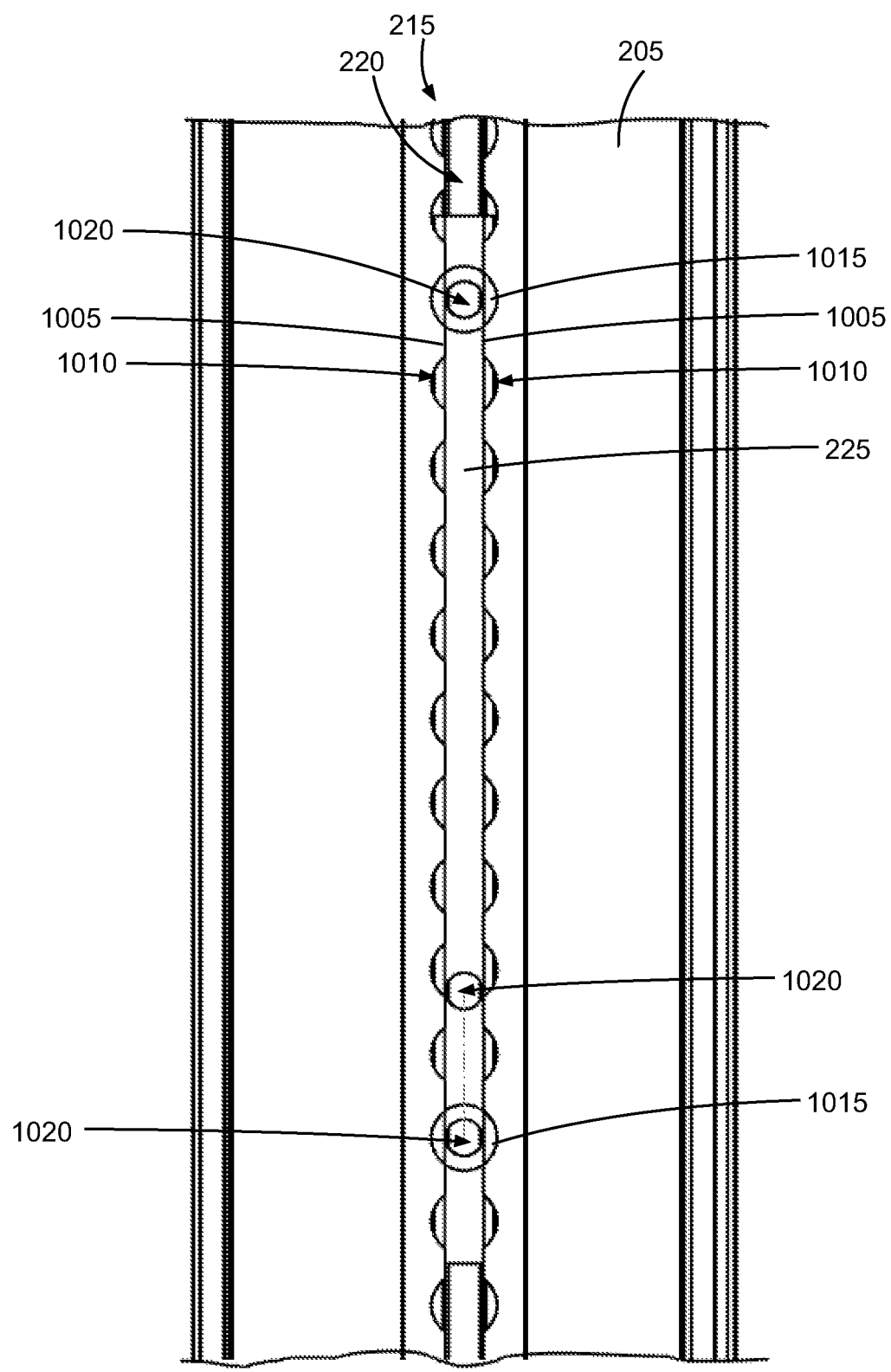
FIG. 10 is a top view of the floor panel.

As can be seen in FIG. 10, the tracks 215 include the track channels 220 that are configured to receive one or more foot 225. Each foot 225 is configured to slide into the track channels 220 of the tracks 215. The foot 225 forms a positive lock with the track 215 in the track channel 220. The foot 225 is also slidably received in the floor panels 205 so that the foot 225 can be repositioned or removed to accommodate different seating arrangements. The foot 225 forms a positive locking arrangement with the track channels 220 so that the support structures 120 remain firmly secured to the flooring system 115.

The tracks 215 are defined by one or more track edges 1005. It should be appreciated that the track edges 1005 may be any distance away from one another depending on the need of the consumer. For example, the track edges 1005 may be one centimeter apart, five centimeters apart, ten centimeters apart, 25 centimeters apart, and/or any other distance that may be useful to the consumer. In the example embodiment, the track edges 1005 are interspaced by one or more scalloped sections 1010. The scalloped sections 1010 work in conjunction with one or more washers 1015 to lock the position of the foot 225. The washers 1015 are generally located over one or more fastener holes 1020 through which one or more fasteners are placed. In an embodiment, the fastener protrudes through the foot 225. Once emerging through the foot 225, the fastener receives one or more washers 1015 around its circumference. Placing one or more washers 1015 into one or more of the scalloped sections 1010 locks the foot 225 into position. The washers 1015 are sized to fit within the scalloped sections 1010 but are of a diameter that is larger than the space between the track edges 1005. This prevents any movement of the foot 225 and the support structures 120. To adjust the foot 225, the washers 1015 are removed from the scalloped sections 1010. The foot 225 is then free to be moved to a new position. Once in the chosen position, the foot 225 is locked into its new position by reinserting the washer 1015 into a new scalloped section 1010.

Figure 11:
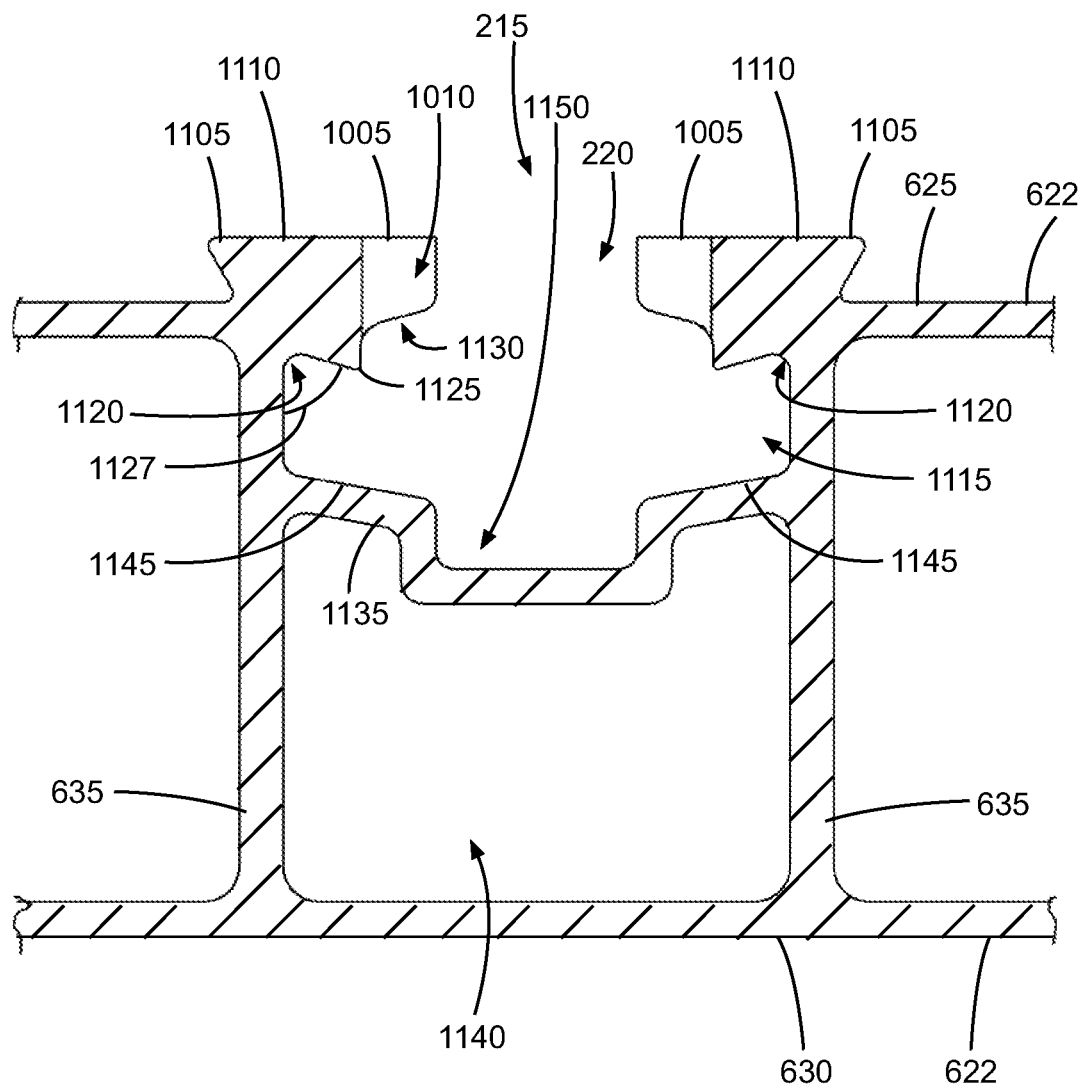
FIG. 11 is a partial cross-sectional view of the floor panel.

As shown in FIG. 11, the passenger facing surface of the track 215 is raised above the passenger facing surface 625 of the floor panels 205 by a track transition ledge 1105. The track transition ledge 1105 serves to define a track surface 1110. The track transition ledge 1105 further serves to maintain a smooth and even flooring surface in the vehicle. The increased height between the passenger facing surface 625 and the track surface 1110 allows a chosen floor covering to cover all of the flooring system 115. For example, the chosen floor covering may be carpet, floor mats, rubber, metal, and/or any other floor covering type material.

The track channels 220 have a positive lock structure 1115. The positive lock structure 1115 is further defined by one or more positive lock grooves 1120 and one or more positive lock ledges 1125. The positive lock grooves 1120 and the positive lock ledges 1125 work to prevent the foot 225 from moving upward towards the passengers in the event of a collision. The positive lock structure 1115 includes a positive lock angle 1127. The positive lock angle 1127 is an acute angle when measured upwards from the tip of the positive lock ledges 1125 with reference to a plane created by the vehicle facing surface 630. In one embodiment, the positive lock angle 1127 is approximately 45 degrees.

The track channels 220 further include a crown section 1130, a channel bed 1135, a channel bed cavity 1140, a foot guide surface 1145, and a fastener pocket 1150. The crown section 1130 serves to receive and align the foot 225 in the track channels 220. The channel bed 1135 includes the channel bed cavity 1140, foot guide surfaces 1145, and the fastener pocket 1150. The channel bed cavity 1140 is located between the lower face of the channel bed 1135 and the upper face of the vehicle facing surface 630. The channel bed cavity 1140 is further constrained on either side by one or more ribs 635. The channel bed cavity 1140 serves to lighten the floor panels 205.

The foot guide surfaces 1145 serve as the baseplate for the insertion of the foot 225 into the track channel 220. The foot 225 rests on the surface of the foot guide surfaces 1145. The fastener pocket 1150 is maintained to allow extra space for the inserted fasteners 145. In the case where the bolt is inserted with the shaft facing towards the passengers, the bolt head fits into the fastener pocket 1150 without interference. This allows the foot 225 to be easily slid in or out of the track channels 220 for a change in position.

Figure 12:
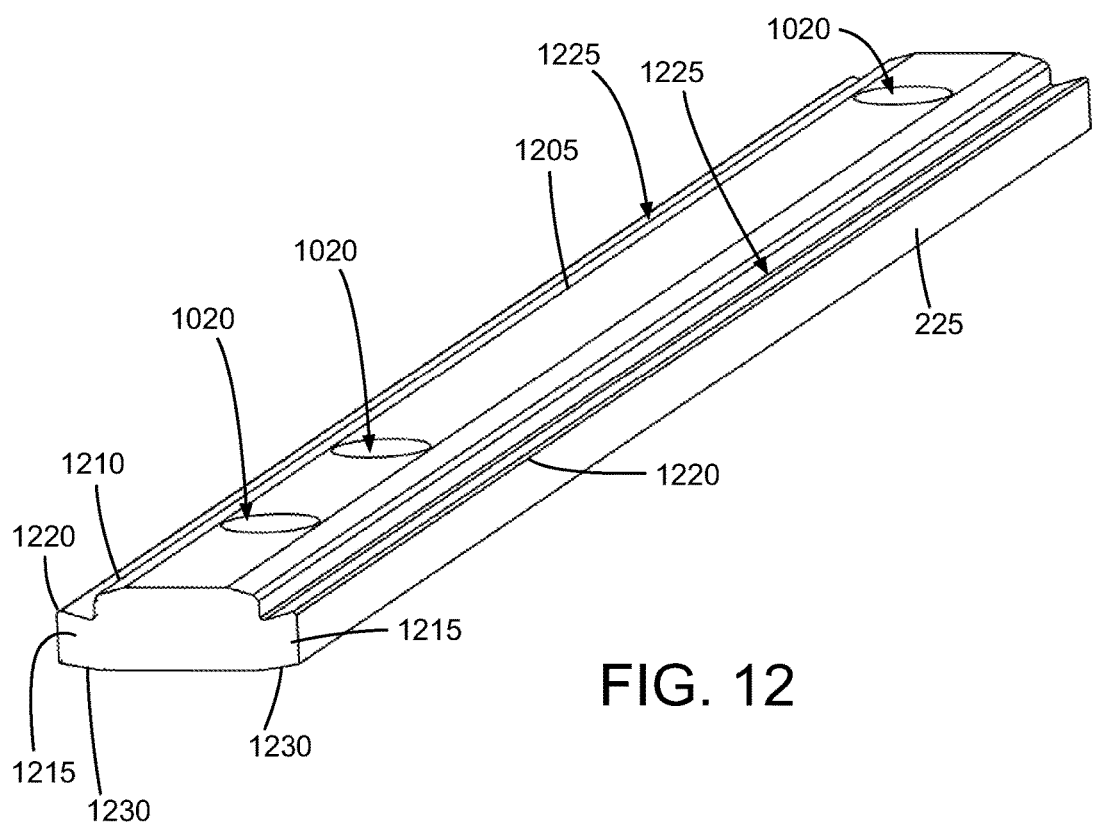
FIG. 12 is a perspective view of a foot for the FIG. 1 flooring system.
Figure 13:
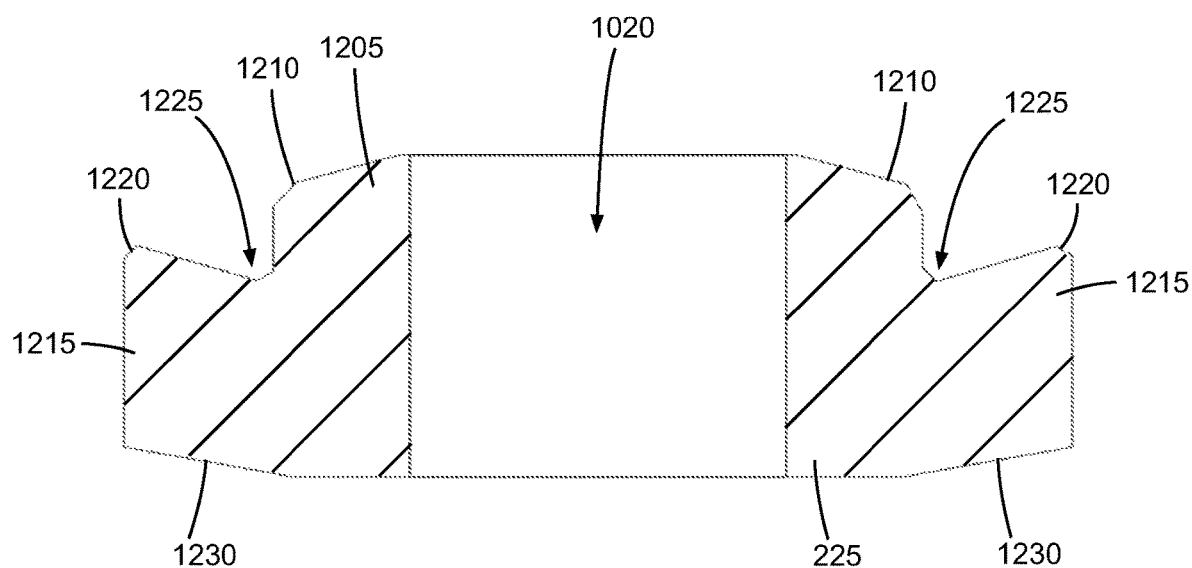
FIG. 13 is a partial cross-sectional view of the FIG. 12 foot.
Figure 14:
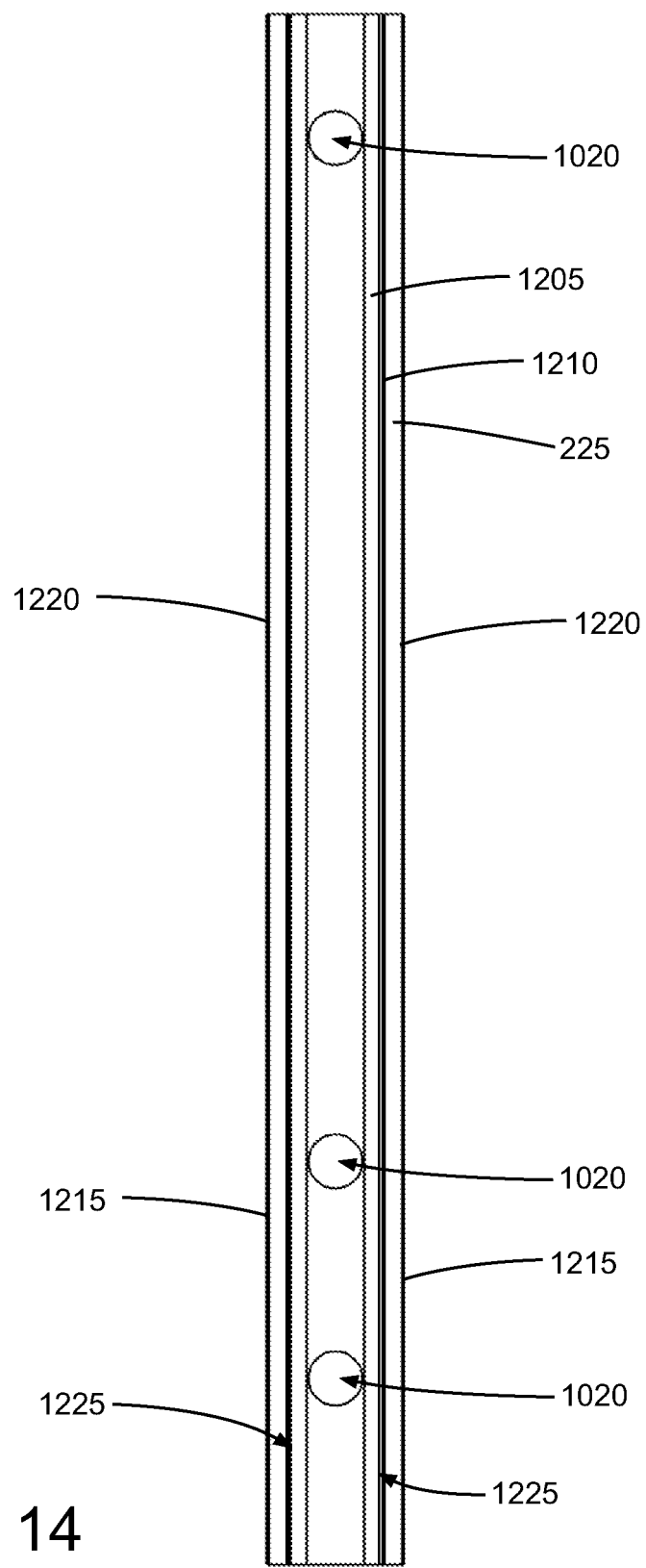
FIG. 14 is a top view of the FIG. 12 foot.

Referring now to FIGS. 12, 13, and 14, the foot 225 is shown. FIG. 12 shows the foot 225 along with one or more fastener holes 1020. Additionally, it can be seen in FIG. 13 that the foot 225 includes a crown 1205 with one or more chamfered edges 1210 and one or more lock wings 1215. The lock wings 1215 further include one or more lock lips 1220, one or more lock channels 1225, and one or more foot guide flanges 1230.

In FIG. 13 a cross sectional view of the foot 225 is shown. The crown 1205 is shown to fall off to either side of the fastener holes 1020 via the chamfered edges 1210. This configuration reduces the contact points between the foot 225 and leg 230 resulting in a tighter fitting connection. The lock wings 1215 are defined on the top portion by the lock lips 1220 and the lock channels 1225. The lock lips 1220 and the lock channels 1225 are configured to interlock with the positive lock grooves 1120 and positive lock ledges 1125 to form the positive lock. The angle created by the positive lock grooves 1120 and positive lock ledges 1125 is congruent to the positive lock angle 1127. This assures a tight fit when the foot 225 is inserted into the track channels 220.

FIG. 14 shows the foot 225 from a top view. As can be seen in FIG. 14, the fastener holes 1020 are able to be spaced at any chosen interval along the length of the foot 225. This flexibility in position allows for multiple seating configurations to be possible with the flooring system 115.

Figure 15:
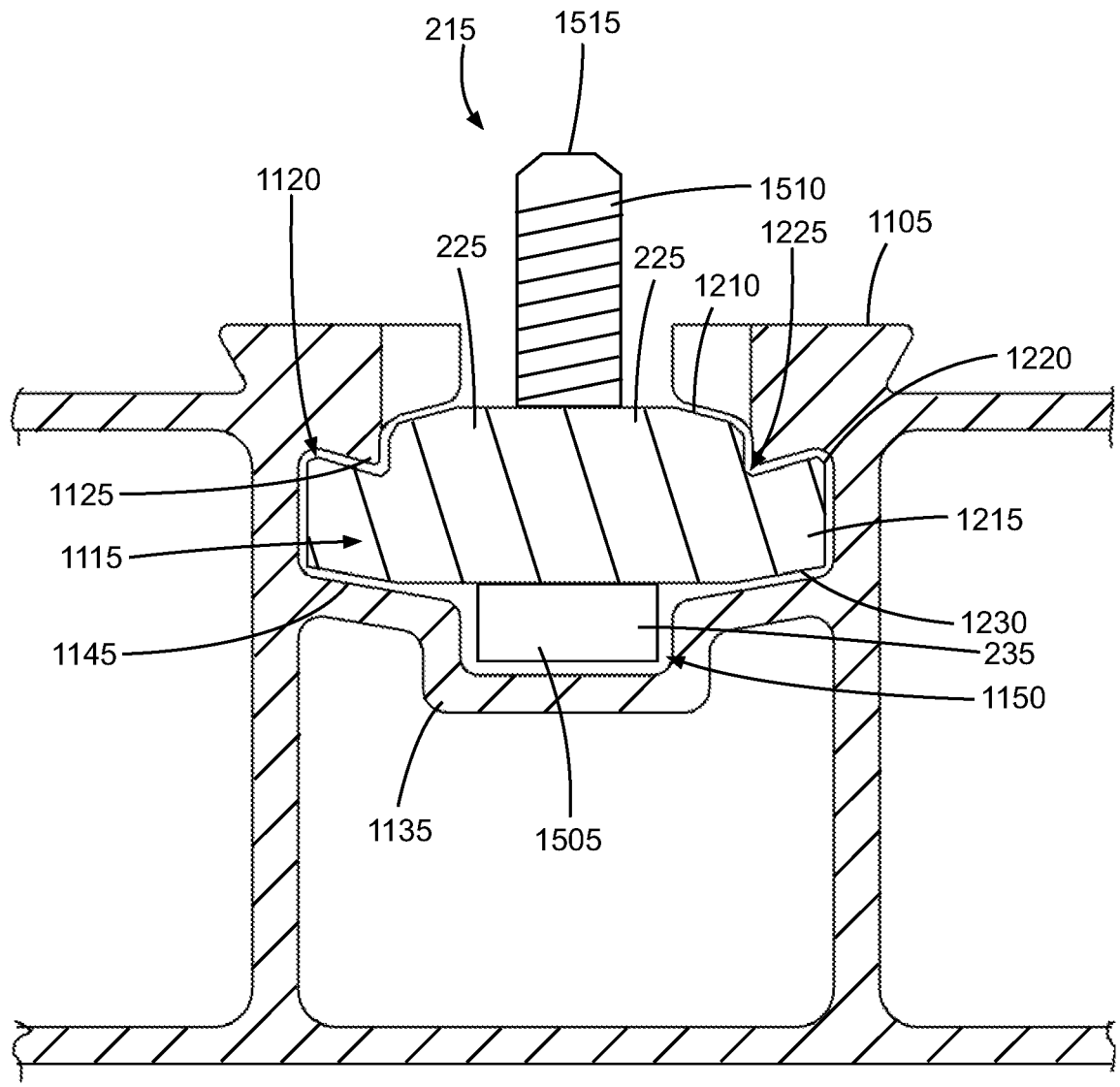
FIG. 15 is a partial cross-sectional view of a fastener secured to the FIG. 12 foot in the tracks of the floor panel.

Looking at FIG. 15, an example of the completed track system is shown. As can be seen, the track 215 and foot 225 have the positive lock structure 1115 that firmly secures the support structure 120 to the flooring system 115. The positive lock structure 1115 helps to prevent the foot 225 from being pulled out of the foot 225 such as during an accident. As can be seen, the lock wings 1215 of the foot 225 are received in the positive lock grooves 1120 of the track 215. Likewise, the positive lock ledges 1125 of the track 215 are received in the lock channels 1225 of the foot 225.

As shown, the fastener 235 has a fastener head 1505 and a fastener shaft 1510 that extends from the fastener head 1505, and the fastener shaft 1510 has a shaft end 1515. During installation, the fastener shaft 1510 of the fastener 235 is inserted through the fastener hole 1020 of the foot 225. Following this, the foot 225 is slid into the track channel 220 of the floor panel 205. When the foot 225 is slid into the track channel 220, the fastener head 1505 is received in the fastener pocket 1150 of the track channel 220. This allows the fastener head 1505 to slide easily along the length of the track 215. Additionally, the fastener 235 position may be flipped such that the fastener head 1505 is on the top of the foot 225 and the shaft end 1515 is protruding down into the fastener pocket 1150. In such a case, a bolt or the like secured to the foot 225 can be received in the fastener pocket 1150.

Glossary of Terms

The language used in the claims and specification is to only have its plain and ordinary meaning, except as explicitly defined below. The words in these definitions are to only have their plain and ordinary meaning. Such plain and ordinary meaning is inclusive of all consistent dictionary definitions from the most recently published Webster's dictionaries and Random House dictionaries. As used in the specification and claims, the following definitions apply to these terms and common variations thereof identified below.

"Adhesive" generally refers to any non metallic substance applied to one or both surfaces of two separate parts that binds them together and resists their separation. For example, an adhesive can bond both mating surfaces through specific adhesion (e.g., molecular attraction), through mechanical anchoring (e.g., by flowing into holes in porous surfaces), and/or through fusion (e.g., partial solution of both surfaces in the adhesive or its solvent vehicle). Some non-limiting examples of adhesives include liquid adhesives, film adhesives, resin adhesives, rubber adhesives, silicone-based adhesives, mastics, metal-to-metal adhesives, plastic adhesives, rubber adhesives, sprayable adhesives, and hot melt adhesives, to name just a few.

"Cavity" generally refers to an empty space in a solid object. The cavity can be completely or partially surrounded by the solid object. For example, the cavity can be open to the surrounding environment.

"Channel" generally refers to a long, narrow groove in a surface of an object.

"Fastener" generally refers to a hardware device that mechanically joins or otherwise affixes two or more objects together. By way of nonlimiting examples, the fastener can include bolts, dowels, nails, nuts, pegs, pins, rivets, screws, and snap fasteners, to just name a few.

"Flat" generally refers to an object having a broad level surface but with little height.

"Flex Groove" generally refers to a narrow indentation or notch in an object that allows the object to bend at the notch.

"Floor" generally refers to the flat base panel of a vehicle where the support structures are mounted. The floor can be made of many different materials such as wood, plastics, metals, rubbers, or a combination of materials. The floor may have tracks or mounting brackets for mounting support structures that are flush with the rest of the floor and/or protrude above the standard floor height. The floor of a vehicle is also the primary area for storage as that is where the items are set. For example, when loading the back of a van, the groceries are typically set on the floor. Additionally, the floor may be covered in a material to make it more comfortable. Some materials used may be carpet, rubber, metals, or leathers.

"Foot" generally refers to a structure that secures a support structure, like a seat, to a track channel of a flooring system.

"Lateral" generally refers to being situated on, directed toward, or coming from the side. "Longitudinal" generally refers to the length or lengthwise dimension of an object, rather than across.

"Panel" generally refers to a flat or curved component that forms part of another object. Typically, but not always, the panel has a generally rectangular shape.

"Positive Lock" generally refers to a type fastening structure that is configured to remain secured even under vibratory or other loads.

"Seat" generally refers to a type of support structure or a place constructed for the purpose of allowing a human and/or other animal to sit. Some examples of seats include chairs, stools, benches, saddles, and sofas to name just a few. Typically, but not always, the seat can further include a backrest, armrest, and a headrest as well as other features.

"Snap-Fit Connector" or "Snap-Fit Connection" generally refers to a type of attachment device including at least two parts, with at least one of which being flexible, that are interlocked with one another by pushing the parts together. The term "Snap-Fit Connector" may refer to just one of the parts, such as either the protruding or mating part, or both of the parts when joined together. Typically, but not always, the snap-fit connector includes a protrusion of one part, such as a hook, stud, and/or bead, that is deflected briefly during the joining operation and catches in a depression and/or undercut in the mating part. After the parts are joined, the flexible snap-fit parts return to a stress-free condition. The resulting joint may be separable or inseparable depending on the shape of the undercut. The force required to separate the components can vary depending on the design. By way of non-limiting examples, the flexible parts are made of a flexible material such as plastic, metal, and/or carbon fiber composite materials. The snap-fit connectors can include cantilever, torsional, and/or annular type snap-fit connectors. In the annular snap-fit type connector, the connector utilizes a hoop-strain type part to hold the other part in place. In one form, the hoop-strain part is made of an elastic material and has an expandable circumference. In one example, the elastic hoop-strain part is pushed onto a more rigid part so as to secure the two together. Cantilever snap-fit type connectors can form permanent type connections or can be temporary such that the parts can be connected and disconnected multiple times. A multiple use type snap-fit connector typically, but not always, has a lever or pin that is pushed in order to release the snap-fit connection. For a torsional snap fit connector, protruding edges of one part are pushed away from the target insertion area, and the other part then slides in between the protruding edges until a desired distance is reached. Once the desired distance is reached, the edges are then released such that the part is held in place.

"Support Structure" generally refers to any structure that serves to support a person, animal, and/or inanimate object. Some examples of support structures include seats, benches, toolboxes, racks, wheelchairs, gang boxes, handrails, and beds.

"Track" or "Seat Track" generally refers to a mechanical slide structure to which a support structure, such as a vehicle seat, is secured that allows horizontal repositioning or other movement of the support structure.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Wall Thickness" generally refers to the measured distance between the opposing outside surfaces of an object.

"Wheelchair" generally refers to a type of seat that is able to transport a person in a seated position. Typically, but not always, the seat includes one or more wheels that allow the seat to roll along the floor or ground. For example, there are powered wheelchairs in which the seat is propelled by batteries and an electric motor. Another example is manually-propelled wheelchairs where the force is either from the user rotating the wheels themselves (self-propelled) and/or an attendant pushing the chair from behind (attendant propelled).

It should be noted that the singular forms "a," "an," "the," and the like as used in the description and/or the claims include the plural forms unless expressly discussed otherwise. For example, if the specification and/or claims refer to "a device" or "the device", it includes one or more of such devices.

It should be noted that directional terms, such as "up," "down," "top," "bottom," "lateral," "longitudinal," "radial," "circumferential," "horizontal," "vertical," etc., are used herein solely for the convenience of the reader in order to aid in the reader's understanding of the illustrated embodiments, and it is not the intent that the use of these directional terms in any manner limit the described, illustrated, and/or claimed features to a specific direction and/or orientation.

"And/or" is inclusive here, meaning "and" as well as "or". For example, "P and/or Q" encompasses, P, Q, and P with Q; and, such "P and/or Q" may include other elements as well.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by the following claims are desired to be protected. All publications, patents, and patent applications cited in this specification are herein incorporated by reference as if each individual publication, patent, or patent application were specifically and individually indicated to be incorporated by reference and set forth in its entirety herein.

| Reference Numbers | |
| --- | --- |
| 100 | vehicle |
| 105 | passenger cabin |
| 110 | floor |
| 115 | flooring system |
| 120 | support structures |
| 125 | seat |
| 130 | wheelchair |
| 135 | first end |
| 140 | second end |
| 145 | fasteners |
| 150 | adhesive |
| 205 | floor panels |
| 210 | snap-fit connection |
| 215 | tracks |
| 220 | track channels |
| 225 | foot |
| 230 | leg |
| 235 | fastener |
| 240 | bolt |
| 602 | connector sides |
| 605 | connector receptacle side |
| 610 | connector protrusion side |
| 615 | snap-fit connector receptacle |
| 620 | snap-fit connector protrusion |
| 622 | support surfaces |
| 625 | passenger facing surface |
| 630 | vehicle facing surface |
| 635 | ribs |
| 640 | panel cavities |
| 645 | cavity surface |
| 650 | arrows |
| 705 | receptacle arms |
| 710 | receptacle channels |

-continued

| Reference Numbers | |
|---|---|
| 715 | snap-fit notch |
| 720 | receptacle lip |
| 725 | beveled edge |
| 730 | receptacle base |
| 735 | wall thickness |
| 740 | receptacle flex groove |
| 745 | receptacle flex groove wall thickness |
| 747 | guide space surface |
| 750 | connector guide |
| 755 | guide space |
| 805 | connector tongues |
| 810 | guide cavity |
| 815 | tongue head |
| 820 | tongue lip |
| 825 | beveled edge |
| 830 | tongue base |
| 835 | tongue flex groove |
| 840 | tongue flex groove wall thickness |
| 845 | guide end wall |
| 850 | guide side walls |
| 1005 | track edges |
| 1010 | scalloped sections |
| 1015 | washers |
| 1020 | fastener holes |
| 1105 | track transition ledge |
| 1110 | track surface |
| 1115 | positive lock structure |
| 1120 | positive lock grooves |
| 1125 | positive lock ledges |
| 1127 | positive lock angle |
| 1130 | crown section |
| 1135 | channel bed |
| 1140 | channel bed cavity |
| 1145 | foot guide surfaces |
| 1150 | fastener pocket |
| 1205 | crown |
| 1210 | chamfered edges |
| 1215 | lock wings |
| 1220 | lock lips |
| 1225 | lock channels |
| 1230 | foot guide flanges |
| 1505 | fastener head |
| 1510 | fastener shaft |
| 1515 | shaft end |

What is claimed is:

1. A vehicle flooring system, comprising:
a first floor panel having a connector receptacle side;
wherein the first floor panel has a snap-fit connector receptacle on the connector receptacle side;
wherein the snap-fit connector receptacle has a connector guide;
wherein the snap-fit connector receptacle includes a pair of receptacle arms oriented in an opposing manner;
wherein the receptacle arms and the connector guide define a pair of receptacle channels;
a second floor panel having a connector protrusion side;
wherein the second floor panel has a snap-fit connector protrusion on the connector protrusion side;
wherein the snap-fit connector protrusion has a pair of connector tongues oriented in an opposing manner;
wherein the connector tongues are connected with the receptacle arms of the snap-fit connector receptacle;
wherein the connector protrusion side defines a guide cavity;
wherein the connector guide is received in the guide cavity;
wherein, the connector protrusion side has opposing guide side walls defining the guide cavity;
wherein the guide side walls are configured to inhibit rotational movement of the connector guide;
wherein the connector tongues are configured to flex in an inwards direction towards one another during connecting to the receptacle arms; and
wherein the connector tongues are spaced away from contact with the connector guide when the connector tongues are connected with the receptable arms of the snap-fit connector receptacle.

2. The vehicle flooring system of claim 1, wherein the floor panels have a general uniform wall thickness with one or more reduced wall thickness portions at the connector tongues.

3. The vehicle flooring system of claim 2, wherein the floor panels are extruded.

4. The vehicle flooring system of claim 3, wherein the floor panels are made of aluminum.

5. The vehicle flooring system of claim 1, wherein each of the connector tongues defines a tongue flex groove.

6. The vehicle flooring system of claim 1, wherein each of the receptacle arms defines a receptacle flex groove.

7. The vehicle flooring system of claim 1, wherein the receptacle arms extend flush with opposing support surfaces of the first floor panel.

8. The vehicle flooring system of claim 1, wherein the first floor panel has a track that defines a channel.

9. The vehicle flooring system of claim 8, wherein the channel of the track has a positive lock groove defined inside the track.

10. The vehicle flooring system of claim 9, further comprising:
a foot received in the channel of the track to form a positive lock.

11. The vehicle flooring system of claim 10, wherein the foot has a lock wing engaged with the lock groove of the channel to form a positive lock connection.

12. The vehicle flooring system of claim 10, wherein the foot has a crown.

13. The vehicle flooring system of claim 8, wherein the channel of the track is integral with the first floor panel.

14. The vehicle flooring system of claim 13, wherein the channel of the track has one or more angled edges configured to form one or more positive lock grooves.

15. The vehicle flooring system of claim 8, wherein the channel of the track has a fastener pocket.

16. A system, comprising:
a plurality of vehicle floor panels with a snap-fit connection between the floor panels;
wherein the floor panels have a general uniform wall thickness with one or more reduced wall thickness portions at the snap fit connection;
wherein the snap-fit connection includes a snap-fit connector receptacle and a snap-fit connector protrusion;
wherein the snap-fit connector receptacle includes a pair of receptacle arms oriented in an opposing manner;
wherein the snap-fit receptacle has a connector guide disposed between the receptacle arms;
wherein the snap-fit connector protrusion includes a pair of connector tongues oriented in an opposing manner;
wherein the snap-fit connector protrusion defines a guide cavity;
wherein the guide cavity is located between the connector tongues;
wherein the connector tongues are connected with the receptacle arms;
wherein the connector guide is received in the guide cavity;

wherein the reduced wall thickness portions are located at the connector tongues to facilitate bending of the connector tongues;

wherein the reduced well thickness portions of the connector tongues are configured to allow the connector tongues to flex inwardly when connecting to the receptacle arms;

wherein each of the receptacle arms define snap-fit notches;

wherein the receptacle arms have receptacle lips at the snap-fit notches;

wherein the snap-fit notches face the connector tongues;

wherein the receptacle lips of the receptacle arms are interlocked with the connector tongues; and wherein the connector tongues are spaced away from contact with the connector guide when the connector tongues are connected with the receptacle arms of the snap-fit connector receptacle.

17. The system of claim 16, wherein the snap-fit connection includes a cantilever connection between the floor panels.

18. The system of claim 16, wherein the floor panels are extruded.

19. The system of claim 18, wherein the floor panels are made of aluminum.

20. The system of claim 16, wherein each of the connector tongues defines a tongue flex groove.

21. The system of claim 16, wherein each of the receptacle arms defines a receptacle flex groove.

22. The system of claim 16, wherein the receptacle arms extend flush with opposing support surfaces of an adjacent one of the vehicle floor panels.

23. The vehicle flooring system of claim 1, wherein the snap-fit connector receptacle and the snap-fit connector protrusion are configured to connect the first floor panel and the second floor panel together when pushed together in a linear direction.

24. The vehicle flooring system of claim 1, wherein:
the snap-fit connector receptacle extends for the full length of the first floor panel; and
the snap-fit connector protrusion extends for the full length of the second floor panel.

25. The vehicle flooring system of claim 1, wherein the connector tongues extend within the receptacle channels.

26. The vehicle flooring system of claim 1, wherein:
each of the receptacle arms define a snap-fit notch; and
each of the connector tongues has a tongue head that is configured to engage the snap-fit notch of one of the receptacle arms.

27. The system of claim 16, wherein the snap-fit connection is configured to connect the floor panels together when the floor panels are pushed together in a linear direction.

28. The vehicle flooring system of claim 1, wherein:
the first floor panel has one or more ribs defining one or more panel cavities; and
the connector guide defines a connector guide space.

29. The vehicle flooring system of claim 1, further comprising:
a vehicle floor;
the first floor panel having an end; and
a bolt securing the end of the first floor panel to the vehicle floor.

\* \* \* \* \*

UNITED STATES PATENT AND TRADEMARK OFFICE
CERTIFICATE OF CORRECTION

PATENT NO. : 11,590,038 B2
APPLICATION NO. : 15/929166
DATED : February 28, 2023
INVENTOR(S) : Anjani Kumar It is certified that error appears in the above-identified patent and that said Letters Patent is hereby corrected as shown below:

In the Claims

Column 14, Claim 1, Line 6, replace "tongues are connected with the receptable arms of the" with --tongues are connected with the receptacle arms of the--

Column 15, Claim 16, Line 4, replace "wherein the reduced well thickness portions of the con-" with --wherein the reduced wall thickness portions of the con- --

Signed and Sealed this
Sixteenth Day of May, 2023

*Katherine Kelly Vidal*

Katherine Kelly Vidal
*Director of the United States Patent and Trademark Office*